(12) United States Patent
Jung et al.

(10) Patent No.: US 8,396,135 B2
(45) Date of Patent: Mar. 12, 2013

(54) VIDEO CODING METHOD AND DEVICE

(75) Inventors: Joël Jung, Le Mesnil Saint-Denis (FR);
Marc Baillavoine, Buc (FR); Patrick Boissonade, Le Mesnil Saint Denis (FR)

(73) Assignee: France Telecom, Paris (FR)

( * ) Notice: Subject to any disclaimer, the term of this patent is extended or adjusted under 35 U.S.C. 154(b) by 904 days.

(21) Appl. No.: 11/988,151

(22) PCT Filed: Jun. 19, 2006

(86) PCT No.: PCT/FR2006/050568
§ 371 (c)(1),
(2), (4) Date: Apr. 22, 2009

(87) PCT Pub. No.: WO2007/003836
PCT Pub. Date: Jan. 11, 2007

(65) Prior Publication Data
US 2009/0213939 A1    Aug. 27, 2009

(30) Foreign Application Priority Data
Jun. 30, 2005    (FR) ..................................... 05 06693

(51) Int. Cl.
*H04B 1/66* (2006.01)

(52) U.S. Cl. ......... 375/240.27; 375/240.26; 375/240.24; 375/240.28; 375/240.25; 375/240.02; 375/240.13; 375/240.12; 382/239; 382/235; 382/233; 382/238; 382/236

(58) Field of Classification Search ............. 375/240.27, 375/240.26, 240.24, 240.28, 240.25, 240.02; 375/240.13, 240.12; 382/239, 233, 235, 382/238, 236
See application file for complete search history.

(56) References Cited

U.S. PATENT DOCUMENTS

| | | | |
|---|---|---|---|
| 6,658,618 B1 * | 12/2003 | Gu et al. ........................ | 714/746 |
| 6,744,924 B1 * | 6/2004 | Hannuksela et al. ......... | 382/232 |
| 7,253,831 B2 * | 8/2007 | Gu ............................. | 348/14.09 |

FOREIGN PATENT DOCUMENTS
EP    0 753 968    1/1997

OTHER PUBLICATIONS

Baillavoine et al., Definition of a back channel for H.264, Jan. 2005, ITU-T VCEG, VCEG-Y15, pp. 1-8.*
Jeorg Ott, et al., "Extended RTP Profile for RTCP-based Feedback (RTP/AVPF)", IETF/AVT Draft Aug. 10, 2004, pp. 1-47.

(Continued)

*Primary Examiner* — Shawn An
(74) *Attorney, Agent, or Firm* — Cozen O'Connor

(57) ABSTRACT

A video coding method, comprising the following steps: a) successive images (F) of a video sequence are coded to generate coding parameters, b) the coding parameters are included in an output stream (Φ) to be transmitted to a station (B) including a decoder (2), c) back channel information on reconstruction of the images of the video sequence by the decoder is received from said station, d) the back channel information is analyzed in order: d1) to identify a reconstructed image that includes a portion that has been lost in the decoder, d2) to identify in the subsequent coded images between said reconstructed image and a current image to be coded an image portion that refers to said lost portion identified in the step d1), e) said current image of the video sequence is coded in a coding mode that is a function of the identification or non-identification of a lost portion in the step d).

11 Claims, 5 Drawing Sheets

OTHER PUBLICATIONS

Frederic Loras, et al., "Definition of a back channel for H.264", ITU-T Video Coding Experts Group (ITU-T SG16 Q.6), 24th Meeting: Oct. 18-22, 2003, Palma de Mallorca, Document VCEG-X09, pp. 1-7.

Marc Baillavoine, et al., "Definition of a back channel for H.264: some results", ITU-T Video Coding Experts Group (ITU-T SG16 Q.6), 25th Meeting: Jan. 16-21, 2005, Hong Kong, Document VCEG-Y15, 8 pgs.

ITU-T., "Control protocol for multimedia communication, Recommendation H.245", Jul. 2003, pp. 1-13.

\* cited by examiner

FIGURE 4a

| Image number | n | n-1 | n-2 | LT |
|---|---|---|---|---|
| Lost macroblocs | Empty | Empty | Empty | Empty |

Table TC at t

FIGURE 4b

| Image number | n | n-1 | n-2 | LT |
|---|---|---|---|---|
| Excluded macroblocs | Empty | Empty | Empty | Empty |

Table TMAJ at t

FIGURE 4c

| Image number | n | n-1 | n-2 | LT |
|---|---|---|---|---|
| Lost macroblocs | Empty | $MB_i$ | Empty | Empty |

Table TC at t+1

FIGURE 4d

| Image number | n | n-1 | n-2 | LT |
|---|---|---|---|---|
| Excluded macroblocs | i, i+1, i+8, i+9 | i | Empty | Empty |

Table TMAJ at time t+1

FIGURE 5a

| Image number | n-2 | n-3 | LT |
|---|---|---|---|
| Macroblocs | $MB_0$ | $MB_0$ | $MB_0$ |
| | $MB_1$ | $MB_1$ | $MB_1$ |
| | $MB_2$ | $MB_2$ | $MB_2$ |
| | ... | ... | ... |
| | $MB_n$ | $MB_n$ | $MB_n$ |

Table TC' at t

FIGURE 5b

| Image number | | n-1 | n-2 | n-3 | LT |
|---|---|---|---|---|---|
| Confidence index I | $MB_0$ | 0.5 | 1 | 1 | 1 |
| | $MB_1$ | 0.5 | 1 | 1 | 1 |
| | $MB_2$ | 0.5 | 1 | 1 | 1 |
| | ... | 0.5 | 1 | 1 | 1 |
| | $MB_n$ | 0.5 | 1 | 1 | 1 |

Table TMAJ' at t

FIGURE 5c

| Image number | n-1 | n-2 | n-3 | LT |
|---|---|---|---|---|
| Macroblocs | $MB_0$ | $MB_0$ | $MB_0$ | $MB_0$ |
| | $MB_1$ | $MB_1$ | $MB_1$ | $MB_1$ |
| | vide | $MB_2$ | $MB_2$ | $MB_2$ |
| | ... | ... | ... | ... |
| | $MB_n$ | $MB_n$ | $MB_n$ | $MB_n$ |

Table TC' at t+1

FIGURE 5d

| Image number | | n | n-1 | n-2 | n-3 | LT |
|---|---|---|---|---|---|---|
| Confidence index I | $MB_0$ | 0,5 | 1 | 1 | 1 | 1 |
| | $MB_1$ | 0 | 1 | 1 | 1 | 1 |
| | $MB_2$ | 0 | 0 | 1 | 1 | 1 |
| | ... | 0,5 | 1 | 1 | 1 | 1 |
| | $MB_n$ | 0,5 | 1 | 1 | 1 | 1 |

Table TMAJ' at time t+1

VIDEO CODING METHOD AND DEVICE

RELATED APPLICATIONS

This is a U.S. national stage of application No. PCT/FR2006/050568, filed on Jun. 19, 2006.

This application claims the priority of French patent application no. 05/06693 filed Jun. 30, 2005, the content of which is hereby incorporated by reference.

FIELD OF THE INVENTION

The present invention relates to video coding techniques.

It applies to situations in which a coder producing a coded video signal stream sent to a video decoder has the benefit of a back channel on which the equipment at the decoder end provides information indicating, explicitly or implicitly, whether or not it has been possible to reconstruct the images of the video signal appropriately.

BACKGROUND OF THE INVENTION

Many video coders support an inter-frame coding mode in which movement between successive images of a video sequence is estimated in order for the most recent image to be coded relative to one or more preceding images. Movement in the sequence is estimated, the estimation parameters being sent to the decoder, and the estimation error is converted, quantized, and sent to the decoder.

Each image of the sequence can also be coded without reference to the others. This is known as intra-frame coding. This coding mode exploits spatial correlation within an image. For a given bit rate for transmission from the coder to the decoder, it achieves lower video quality than inter-frame coding because it does not make use of temporal correlation between the successive images of the video sequence.

A video sequence portion routinely has its first image coded in intra-frame mode and subsequent images coded in intra-frame mode or inter-frame mode. Information included in the output stream from the coder indicates the macroblocks coded in intra-frame mode and in inter-frame mode and, for inter-frame mode, the reference image(s) to use.

A problem with inter-frame coding is its behavior in the presence of transmission errors or loss of packets on the communication channel between the coder and the decoder. Deterioration or loss of an image propagates to subsequent images until a new intra-frame coded image arrives.

It is routine for the mode of transmission of the coded signal between the coder and the decoder to generate total or partial loss of certain images. For example, with transmission over a packet network having no guaranteed delivery, such as an IP (Internet Protocol) network, such losses result from the loss or the delayed arrival of certain data packets. Losses can also result from errors introduced by the transmission channel that exceed the correction capabilities of the error corrector codes employed.

In an environment subject to various signal losses, it is necessary to provide mechanisms for improving image quality in the decoder. One of these mechanisms uses a back channel from the decoder to the coder on which the decoder informs the coder that it has lost some or all of certain images. The drawback of this is that:

- the information is not specified temporally, i.e. the number of the image is not known;
- the information is not specified spatially, i.e. the decoder makes no distinction between image portions that have been received and image portions that have been lost.

Following reception of this information, the coder makes coding choices to correct or at least reduce the effects of the transmission errors. Current coders simply send an intra-frame coded image, i.e. one with no reference to the images previously coded in the stream that may contain errors.

These intra-frame coded images are used to refresh the display and to correct errors caused by transmission losses. However, they are not of such good quality as inter-frame coded images. Thus the usual mechanism for compensating image losses leads in any event to deterioration of the quality of the reconstructed signal for a certain time after the loss.

There are also known mechanisms in which the decoder is capable of signaling lost image portions to the coder in more detail (better spatial and temporal location). For example, if during processing of an image N by the decoder the decoder determines that the macroblocks i, j, and k of the image N have been lost, the decoder then informs the coder of the loss of those macroblocks. Such mechanisms are described in the following documents in particular:

IETF/AVT Draft, "Extended RTP Profile for RTCP-based Feedback (RTP/AVPF)", Ott, Wenger, Sato, Burmeister, Rey, August 2004;

ITU-T Video Coding Experts Group (ITU-T SG16 Q.6); VCEG-X09, "Introduction of a back channel for H.264", Loras, October 2004;

ITU-T Video Coding Experts Group (ITU-T SG16 Q.6) VCEG-Y15, "Definition of a back channel for H.264: some results", Baillavoine, Jung, January 2004;

ITU-T, "Control protocol for multimedia communication, Recommendation H.245", July 2003.

The drawback of this type of mechanism is the absence of reaction and therefore of processing by the coder following reception by the coder of information to the effect that image portions have been lost.

SUMMARY OF THE INVENTION

One object of the present invention is to improve the quality of a video signal following transmission errors when there is a back channel from the decoder to the coder.

To attain this and other objects, one aspect of the present invention is directed to a video coding method, comprising the following steps:

a) coding successive images of a video sequence to generate coding parameters;

b) including the coding parameters in an output stream to be transmitted to a station including a decoder;

c) receiving from said station back channel information on reconstruction of the images of the video sequence by the decoder;

d) analyzing the back channel information in order:

d1) to identify among the reconstructed images a reconstructed image that includes a portion that has been lost in the decoder; and d2) to identify in the subsequent coded images between said reconstructed image and a current image to be coded an image portion that refers to the lost portion identified in the step d1); and e) coding the current image of the video sequence in a coding mode that is a function of the identification or non-identification of a lost portion in the step d).

This enables the adoption of the most appropriate coding mode (Intra-frame, 16×16 Inter-frame, 8×8 Inter-frame, etc.) in the coder as a function of the result of the analysis of the back channel information.

In particular this avoids the systematic choice of intraframe coding in the coder in the presence of transmission errors.

Implementations of the method of the invention make use of one or more of the following features:

if a lost portion is identified during the step d1), the current image is coded with reference to the preceding images of the video sequence, excluding said lost portion identified in the step d1) and coded image portions identified in the step d2) as referring to said lost portion;

during the analysis step d):

the identification step d1) includes storing an identifier associated with the reconstructed image in correspondence with a state parameter that indicates either the loss or the absence of loss of a portion of the reconstructed image;

the identification step d2) includes updating the correspondence stored in the step d1) as a function of the identification or non-identification in the subsequent coded images of an image portion that refers to the lost portion identified in the step d1);

the analysis step d) further includes identifying in the reconstructed images image portions that have been received in the decoder;

during the analysis step d):

the identification step d1) includes storing an identifier associated with the reconstructed image in correspondence with a plurality of state parameters some of which are intended to indicate respective portions of the reconstructed image that has been received in the decoder and some others of which are intended to indicate respective portions of the reconstructed image that have been lost in the decoder;

the identification step d2) includes updating the correspondence stored in the step d1) as a function of the identification or non-identification in the subsequent coded images of an image portion that refers to the lost portion identified in the step d1);

the updating step assigns a given state parameter a real value in the range [0,1], where:

the value 0 indicates identification of a lost portion in the reconstructed image and identification of a coded image portion that refers to the lost portion;

the value 1 indicates identification of a received portion in the reconstructed image; and selecting the coding mode for a given image portion of the current image to be coded consists in weighting by the value of the state parameter associated with the given image portion a value that is a function of the distortion of the current image to be coded and the number of coding bits thereof.

Another aspect of the invention relates to a computer program to be installed in a video processing unit, comprising instructions for executing the steps of a video coding method as defined above upon execution of the program by a calculation unit of said unit.

A further aspect of the invention relates to a video coder comprising:

means for coding successive images of a video sequence to generate coding parameters;

means for forming an output stream of the coder to be transmitted to a station including a decoder, the output stream including said coding parameters;

means for receiving from said station back channel information on reconstruction by the decoder of images of the video sequence; and means for analyzing back channel information, comprising:

first identification means for identifying among the reconstructed images a reconstructed image that includes a portion that has been lost in the decoder; and second identification means for identifying in the subsequent coded images between said reconstructed image and a current image to be coded an image portion that refers to said lost portion identified by the first identification means; and means for coding said current image of the video sequence in a coding mode that is a function of the identification or non-identification of a lost portion by said first identification means.

Embodiments of the coder of the invention make use of the following features:

the first identification means further identify among the reconstructed images image portions that are received in the decoder;

said first identification means comprise means for storing an identifier associated with said reconstructed image in correspondence with a plurality of state parameters some of which are intended to indicate respective portions of said reconstructed image that have been received in the decoder and some others of which are intended to indicate respective portions of said reconstructed image that have been lost in the decoder;

said second identification means comprise means for updating said correspondence stored by said storage means as a function of the identification or non-identification in said subsequent coded images of an image portion that refers to said lost portion identified by said first identification means;

said update means comprise means for assigning a given state parameter a real value in the range [0,1], where:

the value 0 indicates identification of a lost portion in said reconstructed image and identification of a coded image portion that refers to said lost portion;

the value 1 indicates identification of a received portion in said reconstructed image;

it further comprises coding mode selection means for selecting one of at least two coding modes for a given image portion of the current image to be coded by weighting by the value of the state parameter associated with said given image portion a value that is a function of the distortion of said current image to be coded and the number of coding bits thereof.

BRIEF DESCRIPTION OF THE DRAWINGS

Other features and advantages of the present invention become apparent in the course of the following description of non-limiting embodiments, which is given with reference to the appended drawings, in which:

FIGS. 4a to 4d show the analysis of back channel information in the FIG. 2 coder in a first embodiment; and FIGS. 5a to 5d show the analysis of back channel information in the FIG. 2 coder in a second embodiment.

DETAILED DESCRIPTION OF THE DRAWINGS

Figure 1:
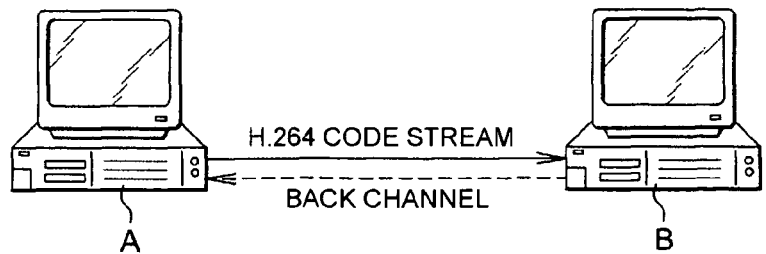
FIG. 1 is a diagram showing two communicating stations provided with video coders/decoders.

The coding method according to the invention is applicable to videoconferences between two stations A and B (FIG. 1)

over an IP network (subject to packet losses), for example. These stations communicate directly, in the sense that no video transcoding equipment participates in their communication. Each station A, B uses video media compressed in accordance with a standard that is based on prediction (differences between the current image and a preceding image) with the aim of transmitting only what has changed between the two images in order to increase the compression. One such standard is the ITU-T H.264 standard, for example.

In a preliminary negotiation phase, using the ITU-T H.323 protocol well known in the IP videoconference field, for example, the stations A, B agree on a dialogue configuration and, using the ITU-T H.241 protocol, agree on a H.264 configuration with long-term marking and on setting up a back channel, for example of the ITU-T H.245 type.

Figure 3:
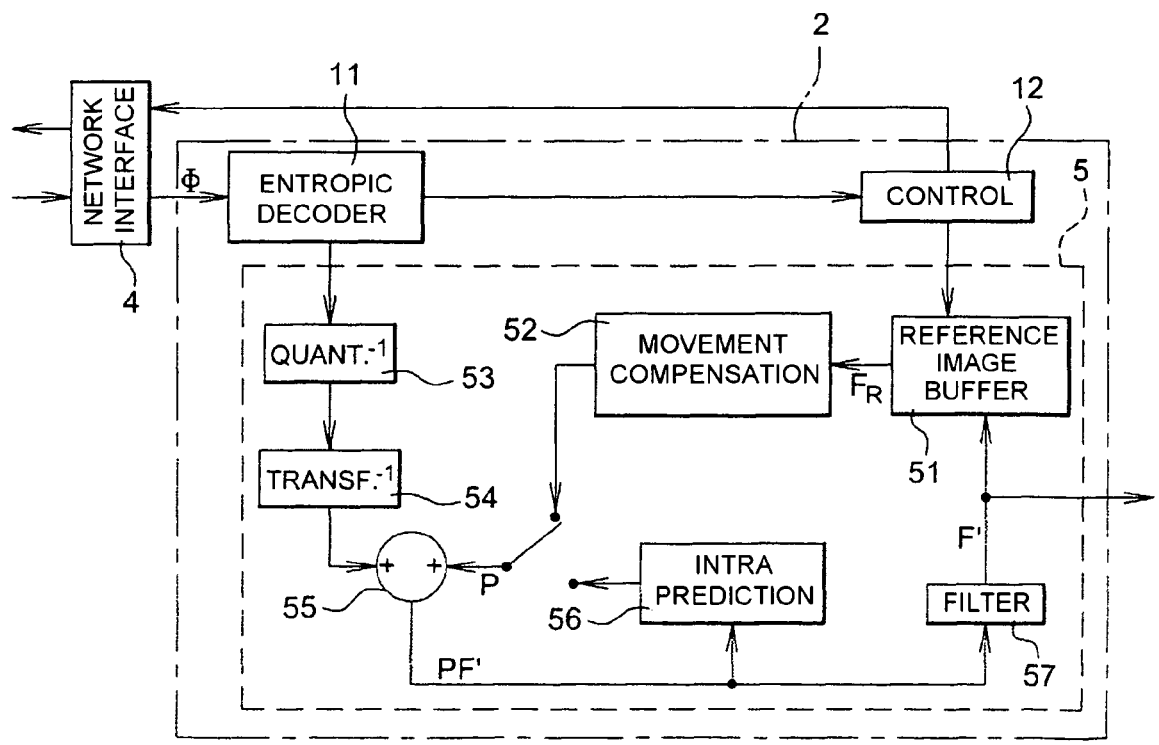
FIG. 3 is a block diagram of a video decoder able to reconstitute images coded by the FIG. 2 coder.

In the example of application to videoconferences, each station A, B is naturally equipped both with a coder and a decoder (codec). It is assumed here that station A is the sender that contains the video coder 1 (FIG. 2) and that station B is the receiver that contains the decoder 2 (FIG. 3). What are of interest are therefore the H.264 stream sent from A to B and the back channel from B to A.

The stations A, B consist of personal computers, for example, as in the FIG. 1 illustration.

Figure 2:
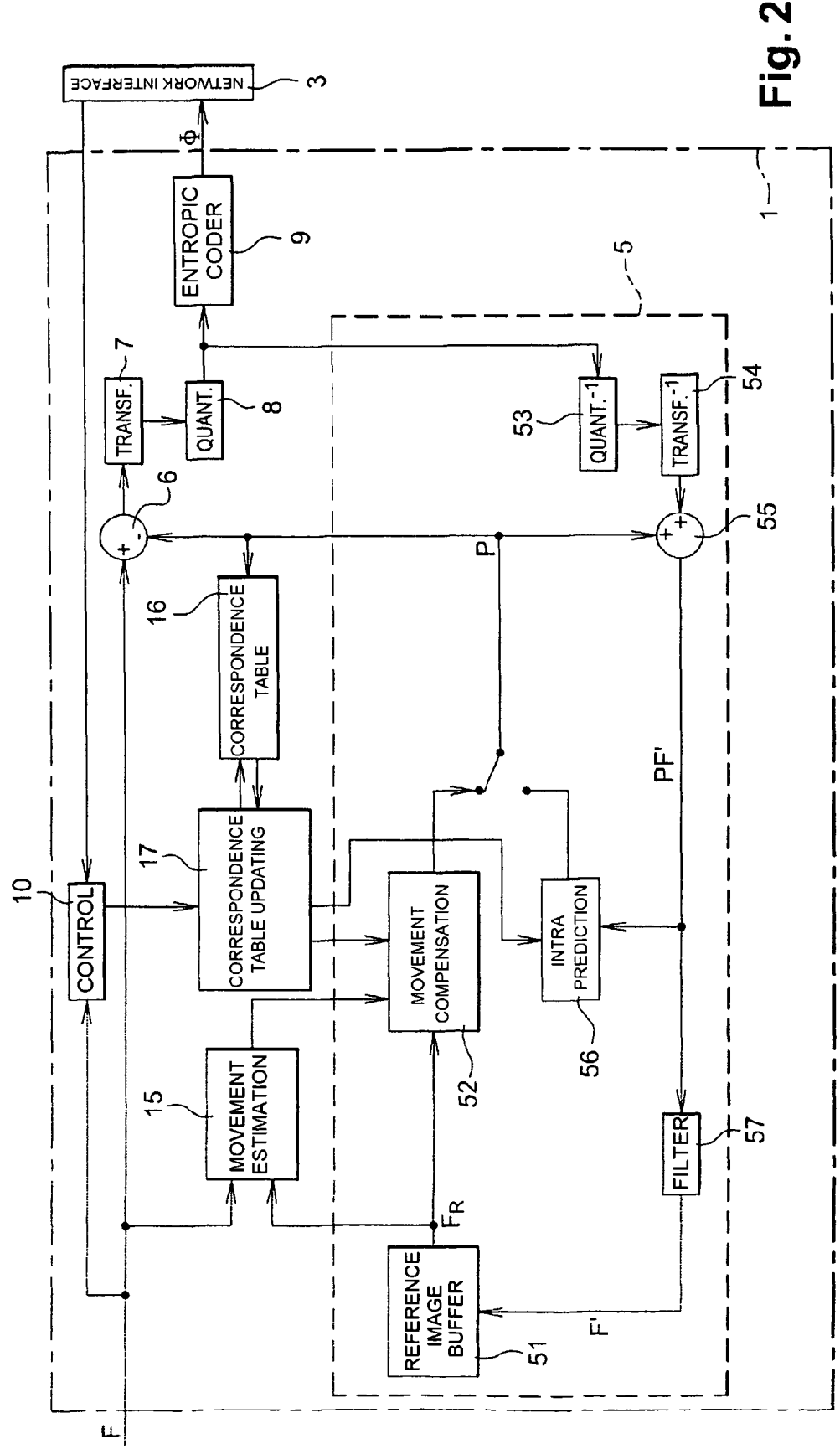
FIG. 2 is a block diagram a video coder according to the invention.

As can be seen in FIGS. 2 and 3, each of the computers A and B is equipped with video image capture and reproduction systems, a network interface 3, 4 for the connection to the IP network, and videoconference software executed by the central processor unit of the computer. For the video codec, this software is based on programs implementing H.264. On the coder side, the program includes the features described below. Of course, the codec can equally well be implemented using a dedicated processor or an application-specific circuit. The method described can also be adapted to coding standards other than H.264.

In H.264, the video image reconstruction module of the decoder 2 is also included in the coder 1. This reconstruction module 5 is seen in each of FIGS. 2 and 3; it consists of substantially identical components carrying the same reference numbers 51-57. The residue from prediction of a current image F, i.e. the difference calculated by a subtractor 6 between the image F and a predicted image P, is converted and quantized by the coder 1 (modules 7, 8 in FIG. 2).

An entropic coding module 9 constructs the output stream Φ of the coder 1 that includes the coding parameters of the successive images of the video sequence (converted residue prediction and quantization parameters) together with various control parameters obtained by a control module 10 of the coder 1.

Those control parameters indicate in particular which coding mode (inter-frame or intra-frame) is used for the current image and, with inter-frame coding, the reference image(s) to use.

At the decoder 2 end, the stream Φ received by the network interface 4 is passed to an entropic decoder 11 which recovers the coding parameters and the control parameters, the control parameters being supplied to a control module 12 of the decoder 2. The control modules 10 and 12 supervise the coder 1 and the decoder 2, respectively, feeding them the commands necessary for determining the coding mode employed, designating the reference images in inter-frame coding, configuring and setting the parameters of the conversion elements, quantization and filtering, etc.

For inter-frame coding, each usable reference image $F_R$ is stored in a buffer 51 of the reconstruction module 5. The buffer contains a window of N reconstructed images immediately preceding the current image (short-term images) and where appropriate one or more images that the coder has specifically marked (long-term images).

The number N of short-term images held in memory is controlled by the coder 1. It is usually limited so as not to occupy too much of the resources of the stations A, B. These short-term images are refreshed after N images of the video stream.

Each image marked long-term is retained in the buffer 51 of the decoder 2 (and in that of the coder 1) until the coder produces a corresponding unmarking command. Thus the control parameters obtained by the module 10 and inserted into the stream Φ also include commands for marking and unmarking the long-term images.

A movement estimation module 15 calculates the prediction parameters for inter-frame coding by a known method as a function of the current image F and one or more reference images $F_R$. The predicted image P is generated by a movement compensation module 52 on the basis of the reference image(s) $F_R$ and the prediction parameters calculated by the module 15.

The reconstruction module 5 includes a module 53 that recovers converted and quantized parameters from quantization indices produced by the quantization module 8. A module 54 effects the opposite conversion to the module 7 to recover a quantized version of the prediction residue. This is added to the blocks of the predicted image P by an adder 55 to supply the blocks of a preprocessed image PF'. The preprocessed image PF' is finally processed by a deblocking filter 57 to supply the reconstituted image F' delivered by the decoder and stored in its buffer 51.

In intra-frame mode, spatial prediction is effected by a known method as and when blocks of the current image F are coded. This prediction is effected by a module 56 on the basis of blocks of the preprocessed image PF' already available.

For a given coding quality, sending intra-frame coded parameters generally requires a higher bit rate than sending inter-frame coded parameters. In other words, for a given transmission bit rate, intra-frame coding of an image of a video sequence achieves lower quality than inter-frame coding.

Choosing between the intra-frame mode and the inter-frame mode for a current image is effected by the control module 10 of the coder 1 (FIG. 2), which, according to the invention, bases its choice on back channel information coming from the control module 12 of the decoder 2 (FIG. 3), such as in particular the loss of a portion or portions of an image, but also the identification of received image portions. Such arrangements are employed in the ITU-T H.263+ standard (Appendix N), for example, and can be transposed to other standards such as H.264.

First Embodiment

A first embodiment is described next, mainly with reference to FIGS. 2 and 4, in which, for a current image, the coder 1 chooses between the intra-frame mode and the inter-frame mode following reception of back channel information from the decoder 2 (FIG. 3) that indicates the loss of one or more portions of images processed by the decoder.

In the example shown, it is assumed that the lost portions of the image are the macroblocks of the image.

In the embodiment shown in FIG. 2, the coder 1 comprises:
  a storage module 16 which stores a correspondence table TC which associates with a given short-term or long-term reference image its macroblocks that have been lost in the decoder 2;

an update module 17 for updating the correspondence table TC as a function of the result of the analysis by the control module 10 of the back channel information.

In particular, the update module 17 contains an update table TMAJ which associates a given short-term or long-term reference image with one or more state parameters indicating whether or not the decoder 2 has identified one or more lost macroblocks in that image.

Assume that in the example shown in FIG. 4a the correspondence table TC of the module 16 contains three short-term reference images n−1, n−2, n−3, and a long-term reference image LT, each identified by their number in an "image number" field and each associated with one or more lost macroblocks in a "lost macroblocks" field.

Assume now that at time t the coder 1 processes the image n and that the decoder 2 has not signaled any loss to the coder 1.

Consequently, referring to FIG. 4b, the update module 17 updates the table TMAJ so that each reference image indicated in the "image number" field is associated with a state parameter indicated in an "excluded macroblocks" field, that state parameter being "empty", for example, since no loss has been signaled by the decoder 2.

On the basis of the content of the update table TMAJ at time t, the coder 1 then chooses to code the image n in inter-frame mode via the movement compensation module 52 because of the absence of deterioration of the preceding reference images n−1, n−2, n−3, and LT.

Assume now, with reference to FIG. 4c, that at time t+1 the decoder 2 processes the image n−1 and the coder processes the image n+1.

During processing, the decoder 2 identifies the loss of a macroblock of the image n−1, for example the macroblock $MB_i$. The decoder 2 then sends this information to the coder 1 via the control module 12 and the network interface 4 (FIG. 3).

The control module 10 of the coder 1 analyses this information and detects the indication of the loss of the macroblock $MB_i$ of the image n−1. As can be seen in FIG. 4b, the correspondence table TC is then modified at time t+1 so that the image n−1 is associated with its lost macroblock $MB_i$.

At the same time t+1, the coder 1 determines that the image n+1 to be coded must exclude the macroblock $MB_i$ of the image n−1, but also all the macroblocks of the image n that refer to the macroblock i of the image n−1, such as the macroblocks $MB_i$, $MB_{i+1}$, $MB_{i+8}$, $MB_{i+9}$, for example. To this end, the control module 10 activates the update module 17 to update the correspondence table TMAJ.

As can be seen in FIG. 4d, the correspondence table TMAJ is updated at time t+1 so that, firstly, the image n−1 is associated with a state parameter that indicates the loss of the macroblock $MB_i$ and, secondly, the image n is associated with state parameters that indicate the exclusion of its macroblocks $MB_i$, $MB_{i+1}$, $MB_{i+8}$, $MB_{i+9}$. In the example represented, each state parameter is represented by the index of the macroblock to be excluded, namely "i" for the last macroblock $MB_i$ of the image n−1 and "i", "i+1", "i+8", and "i+9" for the macroblocks to be excluded from the image n.

On the basis of the content of the update table TMAJ at time t+1, the coder 1 then chooses to code the image n+1 in inter-frame mode via the movement compensation module 52 to minimize the deterioration of the quality of the image n+1 following detection of the loss of the macroblock $MB_i$, signaled by the decoder 2, and the decision to exclude the aforementioned macroblocks $MB_i$, $MB_{i+1}$, $MB_{i+8}$, $MB_{i+9}$. The method therefore favors resumption of coding, not in the event of transmission errors in intra-frame mode, like current coders, but rather in inter-frame mode.

The tables TC and TMAJ are managed in this way for each image of the video sequence.

Second Embodiment

A second embodiment is described next, mainly with reference to FIGS. 2 and 5, in which the coder 1, for a current image, chooses between the intra-frame mode and the inter-frame mode following reception of back channel information from the decoder 2 (FIG. 3) that indicates not only the loss of one or more portions of images processed by the decoder, as in the above first embodiment, but also received image portions processed by the decoder 2.

In the example represented, it is again assumed that the lost portions of the image are the macroblocks of that image.

The second embodiment also differs from the first embodiment in that:
  the storage module 16 includes a correspondence table TC' the content of which differs from that of the above correspondence table TC;
  the update module 17 includes an update table TMAJ' the content of which differs from that of the above update table TMAJ.

To be more precise: for a given short-term or long-term reference image, a correspondence table TC' associates its macroblocks that have been lost in the decoder 2 and its macroblocks that have been received by the decoder 2;
  for a given short-term or long-term reference image, the update table TMAJ' associates each of its lost or received macroblocks $MB_0$, $MB_1$, ..., $MB_n$ with a state parameter I referred to below as the "confidence index".

This confidence index I is a real value in the range [0;1] where:
  for a given macroblock, the value 0 indicates that the macroblock cannot be trusted;
  for a given macroblock, the value 1 indicates that the macroblock can be trusted and that its use as a reference macroblock is even recommended.

Assume that in the example represented in FIG. 5a the correspondence table TC' of the module 16 contains two short-term reference images n−2, n−3, and a long-term reference image LT, each identified by its number in an "image number" field and each associated in a "macroblocks" field with one or more lost macroblocks and one or more received macroblocks.

Assume now that at time t the coder 1 processes the image n and the decoder 2 processes the image n−2.

Assume further that at this time t the decoder 2 does not signal any loss to the coder 1 in respect of the image n−2.

Consequently, at time t the correspondence table TC' is as represented in 5a.

At time t, the update module 17 updates the table TMAJ' so that for each reference image indicated in the "image number" field each macroblock of that reference image is associated with a confidence index I value in a "confidence index" field.

As shown in FIG. 5b, because no loss has been signaled by the decoder 2 in respect of the images n−2, n−3, and LT, each macroblock associated with the images n−2, n−3, and LT is associated with a confidence index I of value 1, which assures the reliability of such macroblocks. In contrast, with regard to the image n−1, which the decoder 2 has not yet processed at time t, a confidence index I value is then associated with each macroblock of the image n−1, that value being set at 0.5 in the example shown, to indicate uncertainty as to the coding mode that will be chosen for that image.

On the basis of the content of the update table TMAJ' at time t, the movement compensation module 52 and the intra-frame prediction module 56 respectively calculate, for each macroblock identified in the table TMAJ', a cost criterion $J=1/1 \cdot (D+\lambda R)$ where:

I is the confidence index associated with the identified macroblock;

D is the distortion of the identified macroblock, i.e. its deterioration linked to inter-frame or intra-frame coding; and R is the number of bits of the macroblock identified to be coded in inter-frame mode or intra-frame mode.

Whether to code the image n in inter-frame mode or intra-frame mode is chosen at time t as a function of the lowest cost criterion J evaluated.

In the example shown, the cost criterion J calculated by the movement estimation module 52 is the lowest. Consequently, the image n is coded in inter-frame mode.

Referring to FIG. 5c, assume now that at time t+1 the decoder 2 processes the image n−1 and the coder processes the image n+1.

During processing, the decoder 2 identifies the loss of a macroblock of the image n−1, for example the macroblock $MB_2$. The decoder 2 then sends that information to the coder 1 via the control module 12 and the network interface 4 (FIG. 3).

The control module 10 of the coder 1 analyses this information and detects the indication of the loss of the macroblock $MB_2$. As can be seen in FIG. 5c, the correspondence table TC' is then modified at time t+1 so that the loss of the macroblock $MB_2$ of the image n−1 is identified by the "empty" state parameter.

At the same time t+1, the coder 1 determines that the image n+1 to be coded must exclude the macroblock $MB_2$ of the image n−1 and also all the macroblocks of the image n that refer to the macroblock $MB_2$ of the image n−1, for example the macroblocks $MB_2$ and $MB_1$. To this end, the control module 10 activates the update module 17 to update the correspondence table TMAJ'.

As can be seen in FIG. 5d, the correspondence table TMAJ' is updated at time t+1 so that:

each macroblock associated with the images n−2, n−3, and LT is associated with the value 1 of the confidence index I, which assures the reliability of such macroblocks;

the macroblock $MB_2$ associated with the image n−1 is associated with a value 0, since this macroblock has been lost, the other macroblocks of the image n−1 each being associated with the value 1 of the confidence index;

each macroblock of the image n that refers to the macroblock $MB_2$, in particular the macroblock $MB_2$ and $MB_1$, is associated with the value 0 of the confidence index I, the other macroblocks of the image n−1 being moreover each associated with the uncertainty value 0.5 of the confidence index I because the decoder 2 has not yet processed the image n at time t+1.

On the basis of the content of the update table TMAJ' at time t+1, the movement compensation module 52 and the intra-frame prediction module 56 calculate the aforementioned cost criterion J for each macroblock identified in the table TMAJ'.

In the example shown, the cost criterion J calculated by the intra-frame prediction module 56 is the lowest. Consequently, the image n+1 is coded in intra-frame mode.

The second embodiment therefore optimizes even further the strategy of coding at the level of the coder 1, by means of the weighting of the cost criterion by the confidence index, which leads to the choice of the most appropriate coding mode.

This second embodiment achieves an advantageous compromise between coding efficiency and robustness (resistance to errors).

The invention claimed is:

1. A video coding method, comprising the steps of:
a) coding successive images of a video sequence to generate coding parameters;
b) including the coding parameters in an output stream to be transmitted to a station including a decoder;
c) receiving, from said station, back channel information on reconstruction of the images of the video sequence by the decoder;
d) analyzing the back channel information in order to identify among the reconstructed images a reconstructed image that includes a portion that has been lost in the decoder, and in the event of such identification, to identify in the subsequent coded images between said reconstructed image and a current image to be coded an image portion that refers to the lost portion of said reconstructed image; and
e) if at least a portion of the image has been identified as lost in the step d), coding said current image of the video sequence, excluding said identified lost portion and coded image portions identified in the step d) as referring to said lost portion,
wherein said analysis step d) includes:
storing an identifier associated with said reconstructed image, which has been identified, in correspondence with a state parameter that indicates either the loss or the absence of loss of a portion of the reconstructed image; and
updating said correspondence stored as a function of the identification or non-identification in said subsequent coded images of an image portion that refers to the lost portion of said reconstructed image.

2. A method according to claim 1, wherein the analysis step d) further includes identifying in the reconstructed images image portions that have been received in the decoder.

3. A method according to claim 2, wherein, the analysis step d) includes:
storing an identifier associated with said reconstructed image that has been identified, in correspondence with a plurality of state parameters some of which are intended to indicate respective portions of said reconstructed image that have been received in the decoder and some others of which are intended to indicate respective portions of said reconstructed image that have been lost in the decoder; and
updating said correspondence stored as a function of the identification or non-identification in said subsequent coded images of an image portion that refers to said lost portion of said reconstructed image.

4. A method according to claim 3, wherein said updating step assigns a given state parameter a real value in the range [0,1], where:
the value 0 indicates identification of a lost portion in said reconstructed image and identification of a coded image portion that refers to said lost portion;
the value 1 indicates identification of a received portion in said reconstructed image.

5. A method according to claim 4, wherein selecting the coding mode for a given image portion of the current image to be coded consists in weighting by the value of the state parameter associated with said given image portion a value that is a function of the distortion of said current image to be coded and the number of coding bits thereof.

6. A non-transitory computer-readable medium storing a computer program to be installed in a video processing unit, comprising instructions for executing the steps of a video coding method according to claim 1, during execution of the program by a calculation unit of said unit.

7. A computer program stored on a computer readable memory and executing on a processor which, when used in a video processing unit, causes the processor to execute steps of the video coding method according to claim 1.

8. A video coder comprising:
- a first coder configured to code successive images of a video sequence to generate coding parameters;
- a coding module configured to form an output stream of the coder to be transmitted to a station including a decoder, the output stream including said coding parameters;
- a receiver configured to receive from said station back channel information on reconstruction by the decoder of images of the video sequence; and
- a control module configured to analyze back channel information, comprising a correspondence module configured to identify among the reconstructed images a reconstructed image that includes a portion that has been lost in the decoder and, where applicable, for identifying in the subsequent coded images between said reconstructed image and a current image to be coded an image portion that refers to the lost portion of said reconstructed image; and
- a second coder configured to code said current image of the video sequence, excluding said identified lost portion and coded image portions identified as referring to said lost portion, if at least a portion of the image has been identified as lost by the correspondence module, wherein said correspondence module comprises:
- memory for storing an identifier associated with said reconstructed image in correspondence with a plurality of state parameters some of which are intended to indicate respective portions of said reconstructed image that have been received in the decoder and some others of which are intended to indicate respective portions of said reconstructed image that have been lost in the decoder; and
- an update module configured to update said correspondence stored by said memory as a function of the identification or non-identification in said subsequent coded images of an image portion that refers to the lost portion of said reconstructed image that has been identified by said correspondence module.

9. A video coder according to claim 8, wherein said control module further identifies among the reconstructed images image portions that are received in the decoder.

10. A coder according to claim 8, wherein said update module comprises an assignment module which is configured to assign a given state parameter a real value in the range [0,1], where:
- the value 0 indicates identification of a lost portion in said reconstructed image and identification of a coded image portion that refers to said lost portion;
- the value 1 indicates identification of a received portion in said reconstructed image.

11. A coder according to claim 10, further comprising coding mode selection module configured to select a coding mode for a given image portion of the current image to be coded by weighting by the value of the state parameter associated with said given image portion a value that is a function of the distortion of said current image to be coded and the number of coding bits thereof.

* * * * *